June 18, 1940.  R. WALDO  2,204,836

INSULATION TESTING INSTRUMENT

Filed June 1, 1937

INVENTOR.
ROBERT WALDO
BY *Albert M. Parker*
ATTORNEY.

Patented June 18, 1940

2,204,836

UNITED STATES PATENT OFFICE 2,204,836

INSULATION TESTING INSTRUMENT

Robert Waldo, New York, N. Y., assignor to American Flange & Manufacturing Co., New York, N. Y., a corporation of Illinois Application June 1, 1937, Serial No. 145,781

4 Claims. (Cl. 73—51)

This invention relates to heat insulation testing instruments and more particularly to instruments which facilitate comparisons of the heat insulating values of different heat insulating materials.

An object of this invention is to provide simple and inexpensive means for indicating the heat insulating value of heat insulating materials.

Another object of the invention is to provide simple and inexpensive means for providing accurate comparisons of different heat insulating materials.

Still another object of the invention is to provide simple and inexpensive means for giving an accurate comparison of heat propagation by radiation to insulated and uninsulated areas.

An additional object of the invention is to provide means of the above character which performs its function in a manner easily comprehended.

Further objects of the invention will in part be obvious and in part appear hereinafter.

The field of heat insulation has been the subject of considerable study and development of late and particularly when such insulation is to be applied to buildings or homes, either during the construction of such buildings, or as an expedient applied in already constructed buildings or homes where it is desired to diminish as much as possible the transfer of heat either into or out of the building, depending upon the season of the year.

In spite of the great activity in this line, very little has been done towards developing instruments which can be used to point out to the layman, such as a home owner, the real value of insulation and the comparative values of different insulation materials. What few instruments have been constructed to facilitate the making of such tests are expensive and complicated and indicate their results in a manner which can only be comprehended by those who have technical training. The instrument of this invention is simple and straightforward and fills the obvious gap in this field of endeavor.

Conditions to be insulated against are simulated in the instrument of the invention by means of a source of heat within a confined area, at the corners of which area, equidistant from said heat source, are mounted temperature responsive devices. On the introduction of insulating material between the said source and one of said responsive devices, the difference between the indications given by said responsive devices provides a clearly understandable showing of the benefits of insulation, inasmuch as one of said responsive devices is insulated with respect to the source whereas the other is not.

The instrument is also effective to show the difference in the insulating value of various materials since means are provided for facilitating interchange of the same. Here again the different readings obtained from the responsive device which is insulated will bring home to the layman in an obvious manner the relative values of the various insulating materials as they are changed from one to another. A further advantage of the instrument disclosed is that while providing an effective test it is still readily portable and can be operated by plugging into the line of any electric power supply.

For a fuller understanding of the nature and objects of the invention, reference should be had to the following detailed description of the embodiment shown in the accompanying drawing in which.

Figure 1:
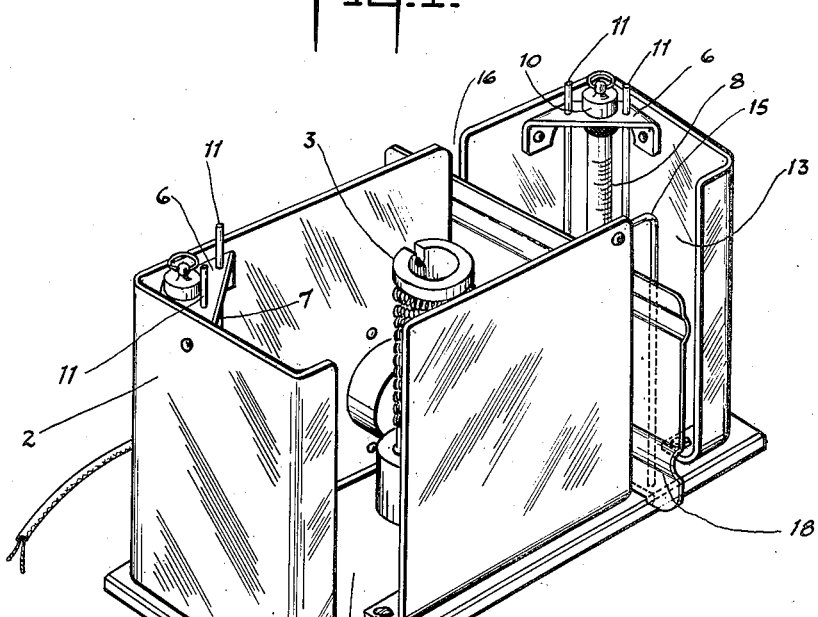
Fig. 1 is a perspective view of the complete instrument showing a section of insulating material in place to be tested.
Figure 2:
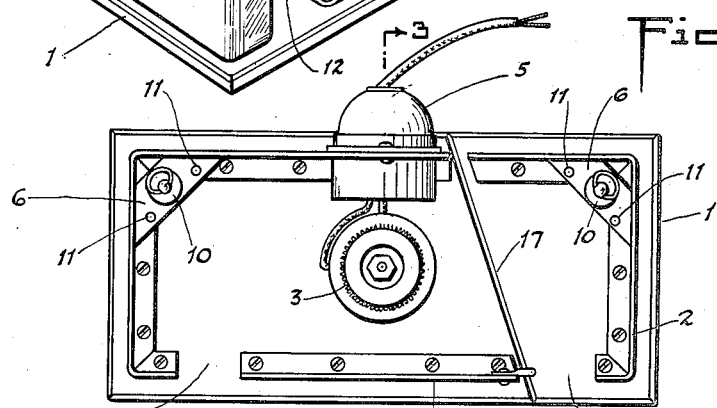
Fig. 2 is a plan view of the instrument of Fig. 1 omitting the material to be tested.
Figure 3:
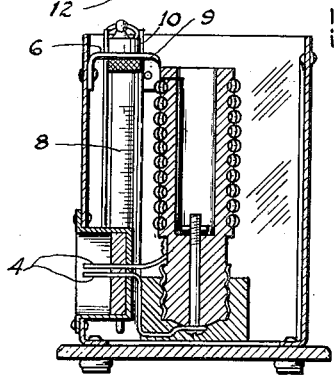
Fig. 3 is a vertical end section on line 3—3 of Fig. 2, the electric contact plug being omitted.

As a foundation for the instrument a rectangular base 1 of Bakelite or similar material is provided. Following the periphery of said base and spaced slightly inwardly therefrom is an upstanding wall generally indicated at 2, which has separated portions, the description of which will appear hereinafter. This wall is formed of a material which is effective as a heat reflector and performs the function of controlling the heat thereinside and substantially preventing drafts in order to insure the existence of substantially similar conditions at corresponding opposed positions therein. Within the wall and mounted centrally upon the base is a heating element generally indicated at 3 and shown for the purposes of illustration as being of the conventional iron wire resistance coil type. Obviously this element could be replaced by any of the conventional devices constructed to perform the same function, without affecting the scope of the invention. Current is supplied to this heating element by means of contacts 4 which receive plug 5 in the conventional manner.

Mounted in the two rear corners of wall 2 by means of identical brackets 6 at points adjacent both the top and the bottom of said wall are identical thermometers 7 and 8, which are of the standard red element 220° F. type. These thermometers are received in apertures located centrally of brackets 6 and are retained in position by the engagement of the threads of a screw threaded sleeve extending upwardly from knurled head 9 with the interior threads of a tubular cap-like member 10. As a protection against breakage identical guide rods 11 are provided mounted in brackets 6 parallel to, at either side of and slightly in front of thermometers 7 and 8.

In order to facilitate observation of thermometers 7 and 8, openings 12 and 13 are provided adjacent the ends of the front portion of wall 2. These openings isolate central panel 14 which extends in front of the heating element 3 and has a guide wire 15 attached thereto, adjacent the upper right-hand corner of the panel. Guide wire 15 extends laterally from its attachment to panel 14 part way into opening 13 and then directly downwardly, having its bottom end secured in base 1. A guiding aperture 16 is provided in the rear portion of wall 2 at an angle across the base from the inside of guide 15. This guiding aperture 16 extends vertically the full height of the wall and cooperates with guide wire 15 in the mounting of a piece of insulating material in the instrument, but is of insufficient width to materially affect the indications given by the instrument. Across the top surface of base 1 and at the angle taken by a sheet of insulating material mounted within guide 15 and aperture 16, there is provided a slot 17 which cooperates with guide 15 and aperture 16 in the mounting and replacement of the insulating material. For the purposes of illustration a sheet of insulating material 18 is shown mounted in position to be tested.

In the operation and use of the instrument two distinct tests, as generally stated above, are possible. First, in order to show the desirability of insulating material in general, any type of such material is inserted in the instrument in the position shown by sheet 18. If the heating element is now energized, the indicating element in thermometer 7 will soon be seen to rise close to the top of its scale; whereas the temperature indicated by thermometer 8, if a good insulating material is in place, will read as a maximum, only about 5° F. above room temperature.

The second type of test, which can be performed by means of this instrument, is that of showing the comparative insulating values of different materials. This can be carried out by first inserting a piece of insulating material, selected as a standard, into proper position in the instrument, energizing the heat source and noting the reading on thermometer 8 when thermometer 7 reads at approximately the top of its scale. Other materials may then be tested against the standard by shutting off the device and allowing it to return to normal, then inserting a different type of insulating material and repeating the original test. Inasmuch as a thermometer is a device read now and then by almost everyone tests easily bring home the points that are desired to be made.

Though ordinary thermometers have been shown for the purposes of illustration, it is considered to be within the scope of this invention to use alternatives, such as thermocouples, which might be set into the end portions of wall 2 and be provided with external indicators. Also in the place of these external indicators a differential meter might be provided which would give a direct reading of the difference in temperatures indicated by the responsive devices. Obviously devices of the thermocouple type, or even the thermometers shown, could be mounted on the base just as well as on the wall.

Further, as already stated, the heating device illustrated is subject to considerable variation without departing from the scope of the invention as a goodly variety of such devices are in common use. In fact any type of a radiant energy source could be employed inasmuch as the device best indicates the effect of energy of a radiant nature.

Since these and other changes may be made in the above construction and different embodiments of the invention may be made without departing from the scope thereof, it is intended that all matter contained in the above description or shown in the accompanying drawing be interpreted as illustrative rather than in a limiting sense.

Having described my invention, what I claim as new and desire to secure by Letters Patent is:

1. In an insulation testing device, a source of radiant energy, means substantially confining the energy from said source to a definite space, radiant energy responsive means within said space and on opposite sides of said source and means for mounting insulating material to be tested in said space and between one of said responsive means and said source.

2. A device for testing insulating materials comprising a base, an upstanding wall of radiant energy reflecting material surrounding said base, a source of radiant energy on said base, radiant energy responsive means mounted at opposite sides of said source, means for mounting insulating material to be tested between said source and one of said responsive means and means rendering visible the response of said responsive means.

3. A device for testing insulating materials comprising a base, an upstanding wall of heat reflecting material surrounding said base, a heat source mounted in the center of said base, temperature indicating devices carried by said wall at points equidistant from said heat source, guide means on said base and said wall for receiving and mounting insulating materials to be tested between said heat source and one of said indicating devices, said wall being removed at spaced points for facilitating reading of said temperature indicating devices.

4. A device for testing insulating materials, comprising a base, a source of radiant energy designed to emit a predominance of heat rays mounted approximately centrally of said base, means surrounding said base for reflecting radiant energy emitted by said source, temperature responsive means mounted adjacent said surrounding means at substantially opposed positions with relation to said source, said surrounding means being formed to facilitate observation of the response of said temperature responsive means and means for positioning insulating material to be tested in definite relation to said source and one of said temperature responsive means, whereby identical tests may be made on various heat insulating materials.

ROBERT WALDO.